(12) United States Patent
Lakare (10) Patent No.: US 8,213,696 B2
(45) Date of Patent: Jul. 3, 2012

(54) TISSUE DETECTION METHOD FOR COMPUTER AIDED DIAGNOSIS AND VISUALIZATION IN THE PRESENCE OF TAGGING

(75) Inventor: Sarang Lakare, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 858 days.

(21) Appl. No.: 12/170,596

(22) Filed: Jul. 10, 2008

(65) Prior Publication Data

US 2009/0016591 A1    Jan. 15, 2009

Related U.S. Application Data

(60) Provisional application No. 60/949,359, filed on Jul. 12, 2007.

(51) Int. Cl.
*G06K 9/00* (2006.01)
(52) U.S. Cl. ..................................... 382/128
(58) Field of Classification Search .................. 382/128
See application file for complete search history.

(56) References Cited

U.S. PATENT DOCUMENTS

| | | | |
|---|---|---|---|
| 7,565,000 B2 * | 7/2009 | Capolunghi et al. | 382/128 |
| 2008/0075345 A1 * | 3/2008 | Unal et al. | 382/131 |
| 2008/0292194 A1 * | 11/2008 | Schmidt et al. | 382/131 |
| 2009/0318802 A1 * | 12/2009 | Boyden et al. | 382/128 |

OTHER PUBLICATIONS

Teo et al., "Creating Connected Representations of Cortical Gray Matter for Functional MRI Visualization", IEEE Transactions on Medical Imaging, IEEE Service Center, Piscataway, NJ, vol. 16, No. 6, Dec. 1, 1997, pp. 854, 862.
Bezdek et al., "Review of MR image segmentation techniques using pattern recognition", Medical Physics, vol. 20, No. 4, Jul. 1993, pp. 1033-1048.
Susomboon et al., "Automatic Single-Organ Segmentation in Computed Tomography Images", Data Mining, 2006, ICDM '06, Sixth International Conference on IEEE, Pl, Dec. 1, 2006, pp. 1081-1086.
Marroquin et al., "An Accurate and Efficient Bayesian Method or Automatic Segmentation of Brain MRI", IEEE Transactions on Medical Imaging, IEEE Service Center, Piscataway, NJ, vol. 21, No. 8, Aug. 1, 2002, pp. 934, 936.
Pham et al., "Current Methods in Medical Image Segmentation", Annual Review of Biomedical Engineering, Annual Review INCO, Palo Alto, CA, vol. 2, Aug. 1, 2000, pp. 323-327.
Saha et al., "Fuzzy connectedness and image segmentation", Proceedings of the IEEE, IEEE, New York, vol. 91, No. 10, Oct. 1, 2003, pp. 1649-1669.
International Search Report including Notification of Transmittal of the International Search Report, International Search Report, and Written Opinion of the International Searching Authority, Feb. 2008.

* cited by examiner

*Primary Examiner* — Christopher Mahoney
(74) *Attorney, Agent, or Firm* — Peter Withstandley (57) ABSTRACT

A method for obtaining a tissue volume, includes inputting a dataset including a plurality of voxels; initializing a tissue probability volume for the plurality of voxels to a pre-determined value; updating, by one of increasing or decreasing the tissue probability volume of each of the plurality of voxels, based on corresponding intensity values of each of the plurality of voxels; and generating the tissue volume by combining the updated tissue probability volume and the inputted dataset.

20 Claims, 7 Drawing Sheets

TISSUE DETECTION METHOD FOR COMPUTER AIDED DIAGNOSIS AND VISUALIZATION IN THE PRESENCE OF TAGGING

CROSS-REFERENCE TO RELATED APPLICATION

This application claims the benefit of provisional application Ser. No. 60/949,359, filed Jul. 12, 2007, in the United States Patent and Trademark Office, the entire contents of which are herein incorporated by reference.

BACKGROUND OF THE INVENTION

1. Technical Field

The present disclosure relates to a tissue detection method for computer aided diagnosis, more specifically, to a tissue detection method for computer aided diagnosis and visualization in the presence of tagging.

2. Discussion of the Related Art

The diagnostically superior information available from data acquired from current imaging systems enables the detection of potential problems at earlier and more treatable stages. Given the vast quantity of detailed data acquirable from imaging systems, various methods must be developed to efficiently and accurately process image data. With the aid of computers, advances in image processing are generally performed on digital or digitized images.

Digital images are created from an array of numerical values representing a property (such as a grey scale value or magnetic field strength) associable with a set of anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art.

The 3-D images are made up of discrete volume elements, also referred to as voxels, composed of pixels from the 2-D images. The pixel or voxel properties can be processed to ascertain various properties about the anatomy of a patient associated with such pixels or voxels. Computer-aided diagnosis ("CAD") systems play a critical role in the analysis and visualization of digital imaging data.

The efficient visualization of volumetric datasets is important for many applications, including medical imaging, finite element analysis, mechanical simulations, etc. The 3-dimensional datasets obtained from scanning modalities such as computed tomography (CT), magnetic resonance imaging (MRI), positron emission tomography (PET), ultrasound (US), etc., are usually quite complex, and contain many different objects and structures.

In many instances, it is difficult to distinguish between two different objects that have similar intensity values in the imaged data. In other cases, the region of interest to the user is surrounded either partially or completely by other objects and structures. There is often a need to either remove an obstructing surrounding object, or to keep the region of interest and remove all other objects.

Visualization of an image can be accomplished by volume rendering the image, a set of techniques for displaying, three-dimensional volumetric data onto a two-dimensional display image. In many imaging modalities, resulting intensity values or ranges of values can be correlated with specific types of tissue, enabling one to discriminate, for example, bone, muscle, flesh, and fat tissue, nerve fibers, blood vessels, organ walls, etc., based on the intensity ranges of the voxels within the image. The raw intensity values in the image can serve as input to a transfer function whose output is a transparency or opacity value that can characterize the type of tissue.

A user can then generate a synthetic image from a viewing point by propagating rays from the viewing point to a point in the 2-D image to be generated and integrating the transparency or opacity values along the path until a threshold opacity is reached, at which point the propagation is terminated. The use of opacity values to classify tissue also enables a user to select which tissue is to be displayed and only integrate opacity values corresponding to the selected tissue. In this way, a user can generate synthetic images showing, for example, only blood vessels, only muscle, only bone, etc.

Three-dimensional volume editing is performed in medical imaging applications to provide for an unobstructed view of an object of interest, such as a fetus face. For example the view of the fetus face may be obstructed by the presence of the umbilical cord in front of the fetal head. Accordingly, the obstructing cord should be removed via editing techniques to provide an unobstructed image of the face. Existing commercial software packages perform the clipping either from one of three orthogonal two-dimensional (2D) image slices or directly from the rendered 3D image.

Tagging using a contrast agent is a commonly used technique for highlighting a particular object in imaged data. Tagging is often used to highlight an object of interest, and at times, is also used to highlight an object that is not desirable, but whose physical removal is either impossible or difficult and impractical. For example, tagging is often used in virtual colonoscopy to highlight residual material inside the colon. Physical removal of the residual material is impractical as that can cause significant discomfort for the patient being examined.

As described above, tagging is commonly used in medical imaging to distinguish structures of interest from the rest of the data. When the structures of interest are tissues, tagging is used to highlight non-tissue structures that are not of interest.

Three dimensional (3D) datasets obtained from scanning modalities such as computed tomography (CT), magnetic resonance imaging (MRI), etc., are usually very complex containing many different materials or classes. In many instances, it is almost impossible to distinguish between two different objects that have similar intensity values in the imaged data.

SUMMARY OF THE INVENTION

A method for obtaining a tissue volume, according to an exemplary embodiment of the present invention, includes the steps of inputting a dataset including a plurality of voxels; initializing a tissue probability volume for the plurality of voxels to a pre-determined value; updating, by one of increasing or decreasing the tissue probability volume of each of the plurality of voxels, based on corresponding intensity values of each of the plurality of voxels; and generating the tissue volume by combining the updated tissue probability volume and the inputted dataset.

The step of updating may further comprise updating the tissue probability volume of each of the plurality of voxels based on corresponding entropy values.

The step of updating may further comprise updating the tissue probability volume of each of the plurality of voxels based on whether the voxels belong to partial volume regions.

The step of updating may further comprise updating the tissue probability volume of each of the plurality of voxels based on whether the voxels are connected to each other.

The step of updating may further comprise updating the tissue probability volume of each of the plurality of voxels based on a probability of the voxels being disconnected from each other.

The dataset may be an output from a computed tomography (CT) scanner.

The tissue volume may be used for computer aided detection (CAD) of tissues of interest.

The tissues of interest may be colonic polyps.

The method may further comprise the step of tagging non-tissue structures.

A method for obtaining a tissue volume, according to an exemplary embodiment of the present invention, includes the steps of scanning an anatomical structure to produce a dataset including a plurality of voxels; updating a tissue probability volume of each of the plurality of voxels based on a calculated probability of the voxels belonging to a tissue; and generating the tissue volume by combining the updated tissue probability volume and the dataset.

The calculated probability of the voxels belonging to a tissue may further be based on intensity values of the voxels.

The calculated probability of the voxels belonging to a tissue may further be based on entropy values of the voxels.

The calculated probability of the voxels belonging to a tissue may further be based on whether the voxels belong to partial volume regions.

The calculated probability of the voxels belonging to a tissue may further be based on whether the voxels are connected to each other.

The calculated probability of the voxels belonging to a tissue may further be based on a probability of the voxels being disconnected from each other.

The step of scanning may be performed by a computed tomography (CT) scanner.

The anatomical structure may be a colon.

The tissue volume may be used for computer aided detection (CAD) of colonic polyps of the colon.

The method may further comprise the step of tagging non-tissue structures.

A computer system, according to an exemplary embodiment of the present invention, includes a processor; and a program storage device readable by the computer system, embodying a program of instructions executable by the processor to perform method steps for obtaining a tissue volume, the method including scanning an anatomical structure to produce a dataset including a plurality of voxels; updating a tissue probability volume of each of the plurality of voxels based on a calculated probability of the voxels belonging to a tissue; and generating the tissue volume by combining the updated tissue probability volume and the dataset.

BRIEF DESCRIPTION OF THE DRAWINGS

A more complete appreciation of the present disclosure and many of the attendant aspects thereof will be readily obtained, as the same becomes better understood by reference to the following detailed description, when considered in connection with the accompanying drawings, wherein.

DETAILED DESCRIPTION OF EXEMPLARY EMBODIMENTS

In describing exemplary embodiments of the present disclosure illustrated in the drawings, specific terminology is employed for the sake of clarity. However, the present disclosure is not intended to be limited to the specific terminology so selected, and it is to be understood that each specific element includes all technical equivalents which operate in a similar manner.

Exemplary embodiments of the present invention seek to provide methods for detecting tissue regions while isolating non-tissue regions.

Figure 1:
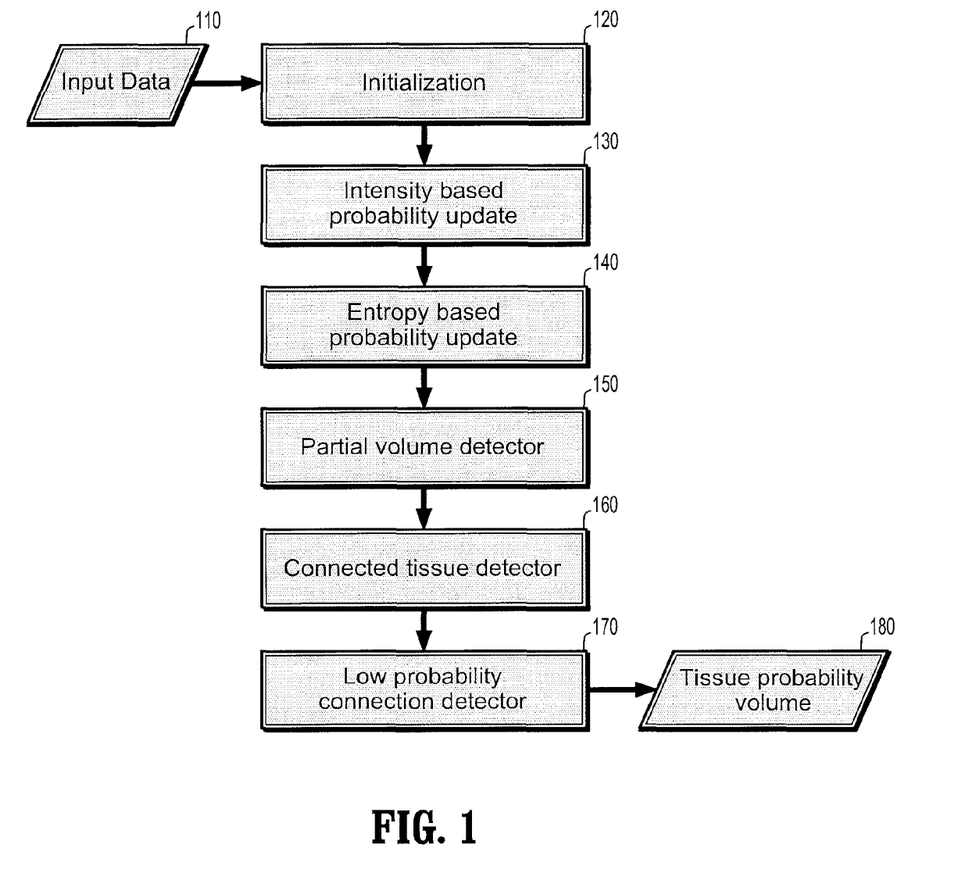
FIG. 1 is a flowchart of a method for detecting tissue regions, according to an exemplary embodiment of the present invention.

FIG. 1 is a flowchart of a method for detecting tissue regions, according to an exemplary embodiment of the present invention.

A tissue probability volume is used to represent the presence of tissue in any given voxel of the input dataset (scan data). A dataset is input (step 110) and after initializing the probabilities of each voxel in the initialization stage (step 120), the tissue probability of each voxel is updated in each of the steps as described below.

A probability update, according to an exemplary embodiment of the present invention, is performed by either adding or subtracting a small delta from the probability associated with the voxel at that time. The delta amount is defined for each step. The end result is a tissue probability volume that has higher probabilities for voxels which represent tissue versus those that belong to other, non-tissue materials in the scan.

In step 120 of FIG. 1, the probability volume is initialized to a value of 0.5 at every voxel, indicating equal probability of the voxel belonging to a tissue material or to a non-tissue material.

In step 130, an intensity based probability update is performed. In this step, the tissue probability at each voxel is updated based on the intensity value (scalar value from the scan) at that voxel. When the voxel intensity match the tissue intensity, the probability of being tissue for the voxel is increased, otherwise it is decreased.

Figure 2:
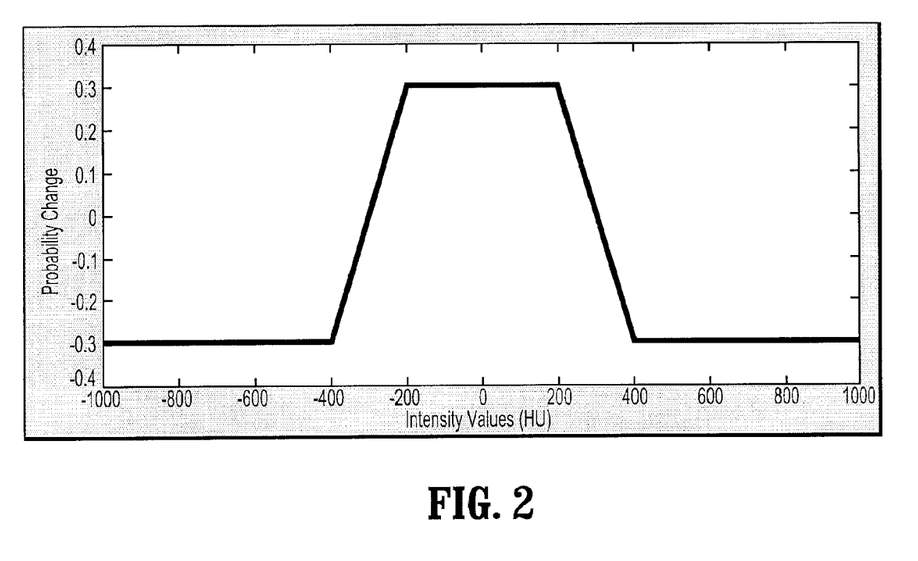
FIG. 2 is a diagram showing a step of updating a tissue probability based on voxel intensity, according to an exemplary embodiment of the present invention.

The expected intensity range for tissue material is based on a priori knowledge of tissue intensities. For example, in CT scans, the tissue voxels usually have a value between −200 and 200 Hounsfield units (HU). Using this information, the probability of a voxel belonging to tissue is increased if its intensity is between −300 and 300 HU and decreased if the voxel intensities are outside of that range. FIG. 2 is an example graph showing the mapping of voxel intensity values to the delta change in tissue probability, according to an exemplary embodiment of the present invention. In step 130, the tissue probability at each voxel is updated by applying the delta change as per the mapping.

Accordingly, in step 130, intensity values are mapped into a bounded change in the voxel's probability.

In step 140, an entropy based probability update is performed.

Tissue regions usually have homogeneous intensity voxels without much noise. However, non-tissue regions may have noise which can result in voxels with intensities in the tissue range. In order to differentiate these voxels from the real tissue voxels, noise is measured using an entropy computation.

Entropy is defined as a quantity specifying the amount of disorder or randomness. We compute the entropy at a given voxel as:

$$E = -\mathrm{sum}(p * \log(p))$$

Where, p is the probability of the occurrence of the voxel intensity in the given volume. The tissue probability of voxels is updated in this step based on the entropy value, by lowering the tissue probability of voxels that have higher entropy values.

In step 150, a partial volume detection is performed.

Partial volume (PV) may result in incorrect classification of some voxels as tissue voxels. In order to avoid this, a PV detector is used to determine voxels that belong to PV regions.

Further, voxels that belong to PV between non-tissue regions are separated from those that might be next to tissue regions. For voxels in the PV region between non-tissue regions, the tissue probability is reduced.

To detect whether a voxel belongs to the PV region between non-tissue regions, the 3D neighborhood of the voxel is analized and the number of voxels with intensities above and below the tissue range is counted. If both these counts are above a certain threshold t, the voxel is marked as a PV voxel and its tissue probability is reduced.

In step 160, a connected tissue detection is performed.

In this step, the fact that most tissues in the body are connected to each other is used. Connected tissues are determined by first finding a seed point to perform a region grow in a region that already has a high tissue probability.

A high tissue probability is defined by a threshold $T_{high}$. Any voxel with probability value greater than $T_{high}$ is considered a high tissue probability voxel. The size of the region for finding the seed point may be configured to make sure small, noisy structures are ignored.

Once a seed point is determined, a connected component region grow is performed to determine all those high tissue probability voxels that are connected to each other to form a connected region. The tissue probability of all these connected voxels is increased, whereas for the disconnected voxels, it is decreased.

Figure 3:
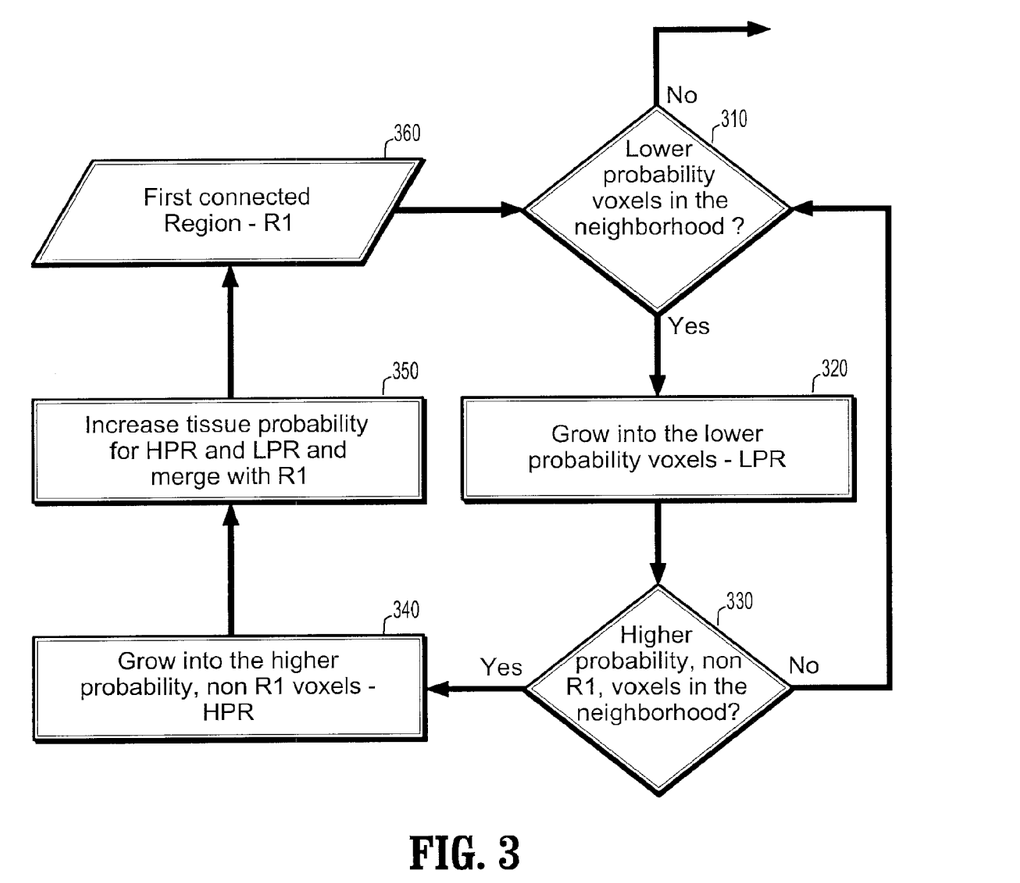
FIG. 3 is a flowchart of a method for finding connected tissue regions which appear to be disconnected, according to an exemplary embodiment of the present invention.

In step 170, low probability connection detection is performed. FIG. 3 is a flowchart of a method for finding connected tissue regions which appear to be disconnected, according to an exemplary embodiment of the present invention.

Often times, although the tissue regions are physically connected in the body, a separation may be shown in the scanned data because of a low sampling frequency or the presence of partial volume. In this step, such regions are identified which otherwise might be considered as disconnected.

The method of FIG. 3 is used after a first connected region (R1) is determined in the connected tissue detection step 160 of FIG. 1. From each voxel on the surface of the first connected region (step 360), lower probability voxels are searched in the neighborhood that have not been considered as part of the first connected region (step 310).

A lower tissue probability is defined by thresholds $T_{high}$ and $T_{low}$. Any voxel with probability value between $T_{high}$ and $T_{low}$, is considered a lower tissue probability voxel. A region grow (step 320) is performed on this lower probability region (LPR).

If this region touches a higher probability region (HPR) that has not been part of the first region (step 330), then a low probability connection is found. Then, a region grow is performed in the higher probability region (step 340), and the probability of the connection as well as the newly discovered regions is increased and merged with R1 (step 350).

As shown in FIG. 3, the steps are repeated until no new lower probability voxels are found next to the first connected region (R1).

Figure 4:
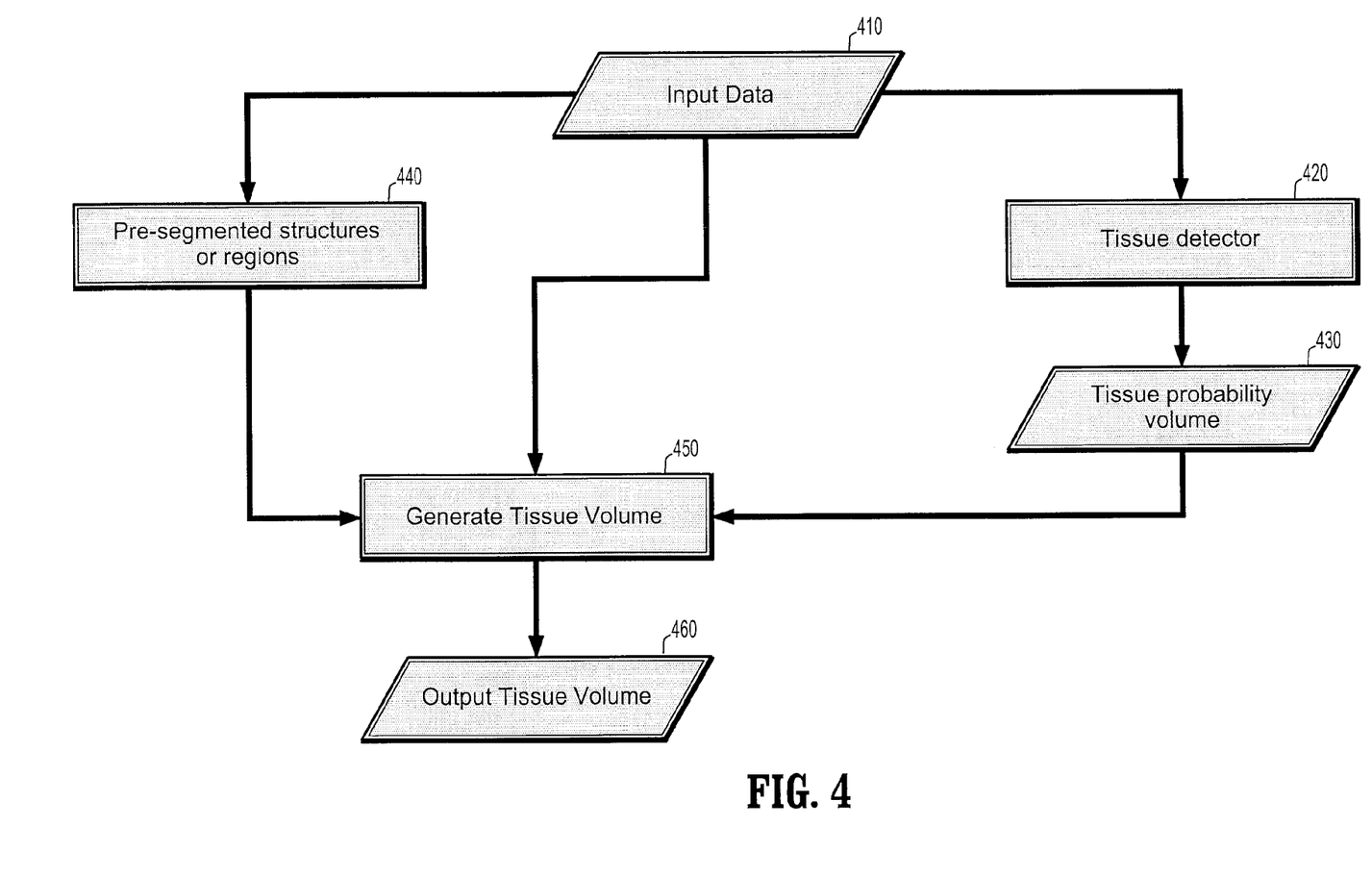
FIG. 4 is a flowchart of a method for generating tissue volume, according to an exemplary embodiment of the present invention.

In step 180, a tissue probability volume is generated. FIG. 4 is a flowchart of a method for generating the tissue volume, according to an exemplary embodiment of the present invention.

The input data (410) and a tissue probability volume (430) are combined to generate and output the tissue volume (460). The tissue volume is a recreation of the input volume such that it only has voxels that belong to the tissue. The rest of the voxels are assigned air intensities so that they can be easily identified and ignored.

In other embodiments, some other desirable structures (for example bones in CT scans) can also be preserved in this tissue volume by pre-segmenting them (440), using techniques known in the art, and then copying the voxels from this pre-segmentation into the tissue volume.

The tissue volume is created and output (460) using the tissue probabilities associated with the voxels at the end of the previous tissue probability detecting steps (420). The goal is to create a volume that resembles the input scanned volume if it were to only have the tissue regions.

For each voxel, the tissue probability is mapped to the voxel intensity in the resulting tissue volume (450). This mapping is done such that lower probability voxels have intensities similar to air intensities where as higher probability voxels have intensities similar to tissue intensities.

Figure 5:
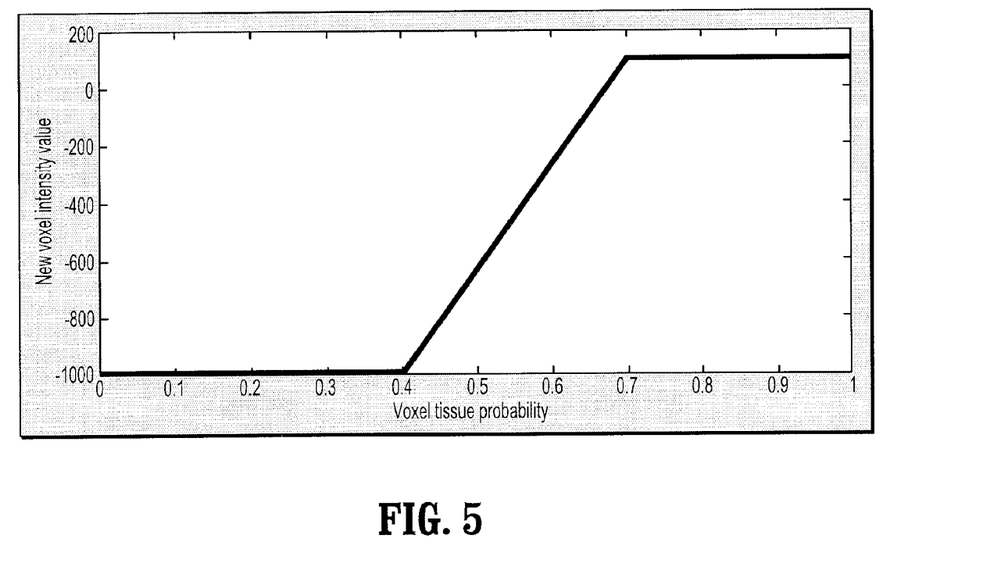
FIG. 5 is a diagram showing a step of assigning intensities to voxels based on their tissue probability when generating the tissue volume, according to an exemplary embodiment of the present invention.

Some a priori knowledge is used to determine the mapped intensity values. For example, for data from a CT scanner, the tissue intensity range is known. FIG. 5 is a diagram showing a step of assigning intensities to voxels based on their tissue probability when generating the tissue volume, according to an exemplary embodiment of the present invention.

In order to preserve the tissue voxels from the input data as much as possible, an additional step may be performed. If a voxel is assigned intensity in the tissue range after the mapping, its original intensity in the input data is checked. If the original intensity was also in the tissue range, the original intensity is copied over to the tissue volume for that voxel. This preserves the original intensities of voxels that belong to the tissues.

Figure 6:
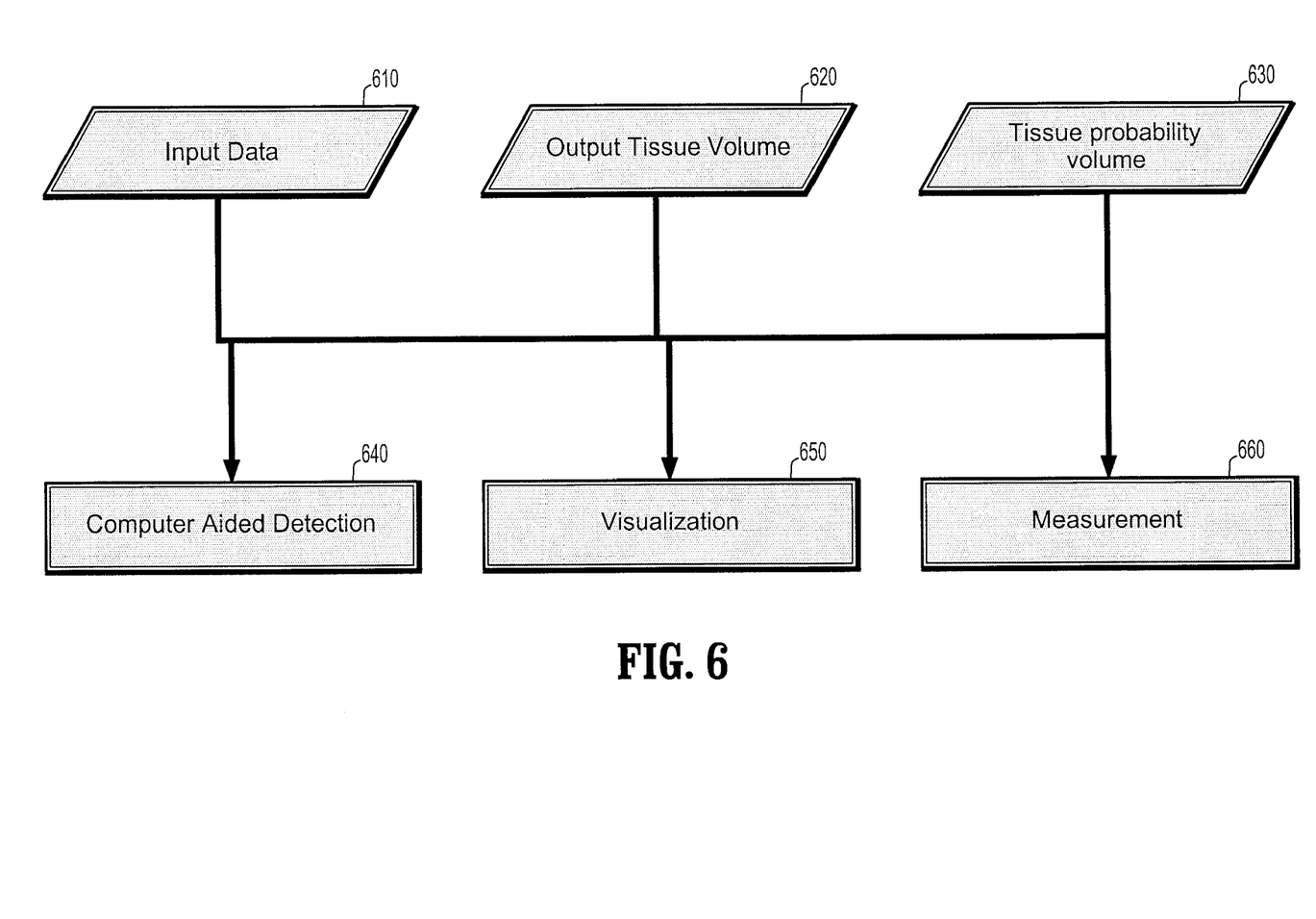
FIG. 6 is a flowchart of a method for computer aided detection (CAD), visualization, and measurement of tissue, according to an exemplary embodiment of the present invention.

FIG. 6 is a flowchart of a method for computer aided detection (CAD), visualization, and measurement of tissue, according to an exemplary embodiment of the present invention.

The input data (610), the tissue probability volume (630), and the tissue volume (620) are used for Computer Aided Detection (CAD). One such application is Colon CAD that aims to detect colonic polyps. These target polyps are always present on the colon wall, which is a tissue. Another example is the detection of lung nodules.

The tissue volume (620) is analyzed to detect polyp shaped objects. Since all the tissue regions have been identified, the presence of other unwanted material such as tagged stool in the input data does not affect the detection.

Visualization (650) is a very important tool in medical imaging and is extensively used by physicians and radiologists to perform diagnosis.

The tissue detection method, according to the exemplary embodiments described above, may be used in applications that have tissue as the region of interest; for example, colonic polyp detection, lung nodule detection, etc.

The tissue volume may be used as input to multi-planar reconstruction algorithms and volume rendering algorithms. A combination of input volume (610), tissue probability volume (630), and tissue volume (620) is also used for providing additional information during visualization. This additional information may include, for example, showing the user the presence of non-tissue regions in the data.

Measurement (660) of structures of interest is often an integral part of a diagnosis workflow. The tissue volume may be used as input for measurement tools and algorithms where the structures of interests are made of tissue. The use of tissue volume prevents non-tissue voxels in the input data from affecting the measurement.

The exemplary methods described above are general and well suited for a broad range of applications where tagging or contrast-enhancement is used and the structures of interest are tissues.

In other exemplary embodiments of the present invention, the aforementioned methods may be used to detect other regions besides tissues, e.g., a bone region. In this example, the "bone probability" of each voxel is updated and a bone probability volume is generated that has higher probabilities for voxels which represent bone versus those that belong to tissue in the scan.

An exemplary application of the embodiments of the methods described above is virtual colonoscopy. The colonic polyps are tissues that are connected to the colon wall, which itself is a tissue. The residual stool and liquid in a patient's colon is tagged and it appears as high intensity in the imaged data.

Although a dataset output from a CT scanner has been used by way of example, outputs from other scanners may be used such as outputs from a magnetic resonance imaging (MRI) scanner or a positron emission tomography (PET) scanner.

Figure 7:
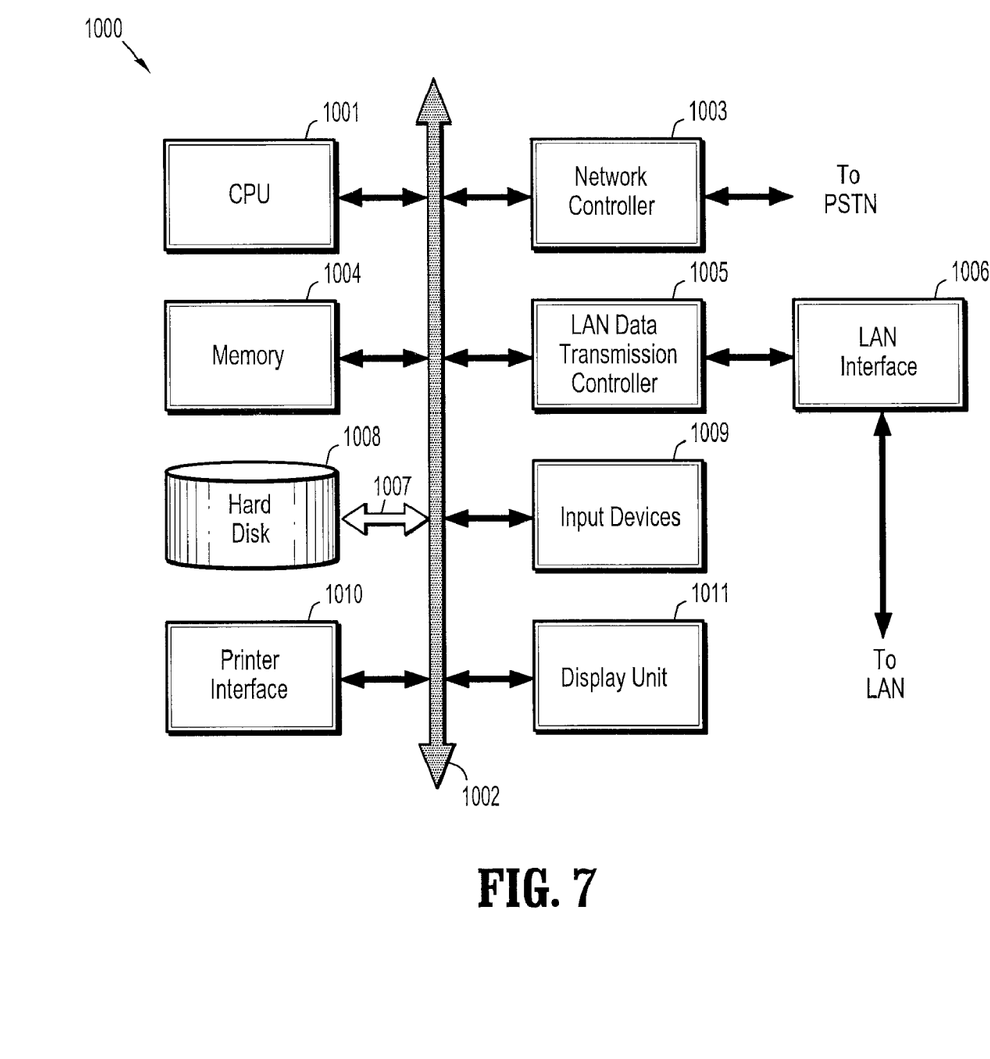
FIG. 7 shows an example of a computer system capable of implementing the tissue detection methods according to exemplary embodiments of the present invention.

FIG. 7 shows an example of a computer system which may implement the methods of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Having described exemplary embodiments of the present invention, it is to be understood that the invention is not limited to the disclosed embodiment, but, on the contrary, is intended to cover various modifications and equivalent arrangements included within the spirit and scope of the disclosure.

What is claimed is:

1. A method for obtaining a tissue volume, comprising the steps of:
   inputting a dataset including a plurality of voxels;
   initializing a tissue probability volume for the plurality of voxels to a pre-determined value, wherein the pre-determined value indicates an initial uniform probability of a voxel belonging to a tissue material;
   updating the tissue probability volume, by one of increasing or decreasing the tissue probability of each of the plurality of voxels, based on whether corresponding intensity values of each of the plurality of voxels match expected tissue intensities; and
   generating the tissue volume by combining the updated tissue probability volume and the inputted dataset.

2. The method of claim 1, wherein the step of updating further comprises updating the tissue probability volume of each of the plurality of voxels based on corresponding entropy values, wherein the entropy values indicate randomness of corresponding voxels.

3. The method of claim 2, wherein the step of updating further comprises updating the tissue probability volume of each of the plurality of voxels based on whether the voxels belong to partial volume regions.

4. The method of claim 3, wherein the step of updating further comprises updating the tissue probability volume of each of the plurality of voxels based on whether the voxels are connected to each other.

5. The method of claim 4, wherein the step of updating further comprises updating the tissue probability volume of each of the plurality of voxels based on a probability of the voxels being disconnected from each other.

6. The method of claim 5, wherein the dataset is an output from one of a computed tomography (CT) scanner, a magnetic resonance imaging (MRI) scanner, or a positron emission tomography (PET) scanner.

7. The method of claim 6, wherein the tissue volume is used for one of computer aided detection (CAD), measurement, or detection of tissues of interest.

8. The method of claim 7, wherein the tissues of interest are one of colonic polyps or lung nodules.

9. The method of claim 8, further comprising the step of tagging and isolating non-tissue structures, wherein the non-tissue structures are one of bones or liquids.

10. A method for obtaining a tissue volume, comprising the steps of:
    scanning an anatomical structure to produce a dataset including a plurality of voxels;
    updating a tissue probability volume of each of the plurality of voxels based on a calculated probability of the voxels belonging to a tissue, wherein the calculated probability of the voxels belonging to a tissue is based on whether corresponding intensity values of the voxels match expected tissue intensities; and
    generating the tissue volume by combining the updated tissue probability volume and the dataset.

11. The method of claim 10 further comprising initializing the tissue probability volume for the plurality of voxels to a pre-determined value, wherein the pre-determined value indicates equal probability of each of the plurality of voxels belonging to a tissue material or to a non-tissue material.

12. The method of claim 11, wherein the calculated probability of the voxels belonging to a tissue is further based on entropy values of the voxels, wherein the entropy values indicate randomness of corresponding voxels.

13. The method of claim 12, wherein the calculated probability of the voxels belonging to a tissue is further based on whether the voxels belong to partial volume regions.

14. The method of claim 13, wherein the calculated probability of the voxels belonging to a tissue is further based on whether the voxels are connected to each other.

15. The method of claim 14, wherein the calculated probability of the voxels belonging to a tissue is further based on a probability of the voxels being disconnected from each other.

16. The method of claim 15, wherein the step of scanning is performed by one of a computed tomography (CT) scanner, a magnetic resonance imaging (MRI) scanner, or a positron emission tomography (PET) scanner.

17. The method of claim 16, wherein the anatomical structure is a colon.

18. The method of claim 17, wherein the tissue volume is used for computer aided detection (CAD), measurement, or visualization of colonic polyps of the colon.

19. The method of claim 18, further comprising the step of tagging and isolating non-tissue structures, wherein the non-tissue structures are one of bones or liquids.

20. A computer system comprising:
a processor; and
a non-transitory program storage device readable by the computer system, embodying a program of instructions executable by the processor to perform method steps for obtaining a tissue volume, the method comprising:
scanning an anatomical structure to produce a dataset including a plurality of voxels;
updating a tissue probability volume of each of the plurality of voxels based on a calculated probability of the voxels belonging to a tissue, wherein the calculated probability of the voxels is based on whether corresponding intensity values of the voxels match expected tissue intensities; and
generating the tissue volume by combining the updated tissue probability volume and the dataset.

* * * * *